(12) United States Patent
Pal et al.

(10) Patent No.: US 8,456,047 B2
(45) Date of Patent: Jun. 4, 2013

(54) INTERNAL THERMAL MANAGEMENT FOR MOTOR DRIVEN MACHINERY

(75) Inventors: Debabrata Pal, Hoffman Estates, IL (US); Laurence D. Vanek, Janesville, WI (US); Daniel M. Saban, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 295 days.

(21) Appl. No.: 12/843,352

(22) Filed: Jul. 26, 2010

(65) Prior Publication Data

US 2010/0289353 A1 Nov. 18, 2010

Related U.S. Application Data

(62) Division of application No. 11/188,915, filed on Jul. 25, 2005, now Pat. No. 7,791,238.

(51) Int. Cl.
*H02K 9/04* (2006.01)

(52) U.S. Cl.
USPC .............................................. 310/61; 310/58

(58) Field of Classification Search
USPC ................ 310/61, 156.12, 58, 59, 60 A, 161; 417/423.8, 366, 371
See application file for complete search history.

(56) References Cited

U.S. PATENT DOCUMENTS

| | | | |
|---|---|---|---|
| 2,891,391 A * | 6/1959 | Grant et al. ....................... 62/475 |
| 3,146,605 A * | 9/1964 | Rachfal et al. ................... 62/197 |
| 3,217,193 A * | 11/1965 | Rayner ............................ 310/54 |
| 3,229,134 A | 1/1966 | Rakula | |
| 3,435,263 A | 3/1969 | Willyoung | |
| 3,465,186 A | 9/1969 | Susdorl et al. | |
| 3,562,568 A | 2/1971 | Susdorf et al. | |
| 3,675,056 A * | 7/1972 | Lenz ................................ 310/54 |
| 3,906,265 A | 9/1975 | Giles | |
| 4,065,231 A * | 12/1977 | Litzenberg ..................... 417/357 |
| 4,182,137 A * | 1/1980 | Erth ................................. 62/505 |
| 4,492,533 A * | 1/1985 | Tsuge ........................... 417/372 |
| 4,545,742 A * | 10/1985 | Schaefer ....................... 417/366 |
| 4,574,210 A | 3/1986 | Wieland | |
| 4,585,967 A | 4/1986 | Mayer et al. | |
| 4,592,703 A * | 6/1986 | Inaba et al. ................... 417/366 |
| 5,098,266 A * | 3/1992 | Takimoto et al. ............... 418/63 |
| 5,158,390 A | 10/1992 | Ito et al. | |
| 5,189,325 A * | 2/1993 | Jarczynski ....................... 310/54 |
| 5,223,757 A | 6/1993 | Staub | |
| 5,331,238 A | 7/1994 | Johnsen | |
| 5,431,547 A * | 7/1995 | Boyko ........................... 417/366 |
| 5,489,810 A | 2/1996 | Ferreira et al. | |

(Continued)

FOREIGN PATENT DOCUMENTS

JP 02019668 A * 1/1990
JP 02264189 A * 10/1990

*Primary Examiner* — Tran N. Nguyen
*Assistant Examiner* — Naishadh Desai
(74) *Attorney, Agent, or Firm* — Carlson, Gaskey & Olds PC

(57) ABSTRACT

A motor driven assembly includes a motor having a motor inlet and a motor outlet, a shaft, and a rotor spaced radially outwards from the shaft. A cooling flow passage is located between the shaft and the rotor. The cooling flow passage fluidly connects the motor inlet and the motor outlet. A compressor is in fluid communication with the motor outlet. The compressor includes a compressor outlet that is in fluid communication with the motor inlet.

18 Claims, 6 Drawing Sheets

U.S. PATENT DOCUMENTS

| | | |
|---|---|---|
| 5,491,371 A | 2/1996 | Ooi |
| 5,624,243 A * | 4/1997 | Omodaka et al. ............ 417/366 |
| 5,866,959 A * | 2/1999 | Le Flem .......................... 310/51 |
| 5,957,667 A * | 9/1999 | Epp ................................ 417/271 |
| 5,997,261 A * | 12/1999 | Kershaw et al. ............. 417/366 |
| 6,000,917 A * | 12/1999 | Smerud et al. ............... 417/368 |
| 6,046,520 A | 4/2000 | Betsch |
| 6,102,672 A * | 8/2000 | Woollenweber et al. ..... 417/366 |
| 6,137,205 A | 10/2000 | Hung et al. |
| 6,191,511 B1 | 2/2001 | Zysset |
| 6,437,468 B2 | 8/2002 | Stahl et al. |
| 6,710,477 B2 | 3/2004 | Lau |
| 6,746,215 B2 * | 6/2004 | Tani et al. .................... 417/366 |
| 6,803,695 B2 | 10/2004 | Yamamoto et al. |
| 6,871,512 B2 * | 3/2005 | Tsunoda ........................ 62/505 |
| 6,965,185 B1 | 11/2005 | Kaminski et al. |
| 6,986,648 B2 * | 1/2006 | Williams et al. ............. 417/370 |
| 7,057,326 B2 | 6/2006 | Ren et al. |
| 7,181,928 B2 * | 2/2007 | de Larminat ................... 62/505 |
| 7,758,320 B2 * | 7/2010 | Pham et al. ................... 417/366 |
| 2002/0125779 A1 | 9/2002 | Qin et al. |
| 2004/0174082 A1 | 9/2004 | Graham |
| 2005/0073215 A1 | 4/2005 | Wang et al. |
| 2005/0125779 A1 | 6/2005 | Kelley et al. |
| 2005/0156471 A1 | 7/2005 | Kobayashi et al. |
| 2007/0018516 A1 | 1/2007 | Pal et al. |

* cited by examiner

US 8,456,047 B2

INTERNAL THERMAL MANAGEMENT FOR MOTOR DRIVEN MACHINERY

RELATED APPLICATION

This is a divisional application of U.S. patent application Ser. No. 11/188,915, filed on Jul. 25, 2005 now U.S. Pat. No. 7,791,238.

BACKGROUND OF THE INVENTION

This invention relates to motor driven machinery and, more particularly, to motor driven turbo machinery with an internal cooling flow arrangement.

Typical motors in motor driven turbo assemblies, such as a motor driven compressor for moving air in an aircraft air conditioning system, include a rotational rotor that rotates about a motor shaft and a stator spaced radially outward of the rotational rotor. The design desire for the aircraft industry has been toward motors of smaller physical size, which provide increased power. As a result, progressively smaller motors are being driven at progressively higher rotational speeds. The combination of higher rotational speeds and smaller size results in significant heat generation, which may reduce magnetization of the rotational rotor and over a prolonged time period may ultimately result in motor or compressor failure.

One possible solution to heat generation in the motor is utilizing airflow through the space between the rotational rotor and the stator to communicate heat away from the motor. In selected conventional motor driven compressor assemblies, an internal portion of the motor is fluidly connected to an inlet port of the compressor. The compressor evacuates the internal portion of the motor during operation. Air evacuated from the motor passes through the space between the rotational rotor and the stator. The size of the space however, has decreased with the decreasing size of the motors. As a result, the airflow through the space is insufficient to provide effective thermal management of the motor.

Accordingly, there is a need for a motor driven assembly having an internal cooling flow arrangement that provides effective thermal management of a relatively small electric motor driven turbo machine.

SUMMARY OF THE INVENTION

An example motor driven assembly includes a motor having a motor inlet and a motor outlet, a shaft, and a rotor spaced radially outwards from the shaft. A cooling flow passage is located between the shaft and the rotor. The cooling flow passage fluidly connects the motor inlet and the motor outlet. A compressor is in fluid communication with the motor outlet. The compressor includes a compressor outlet that is in fluid communication with the motor inlet.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
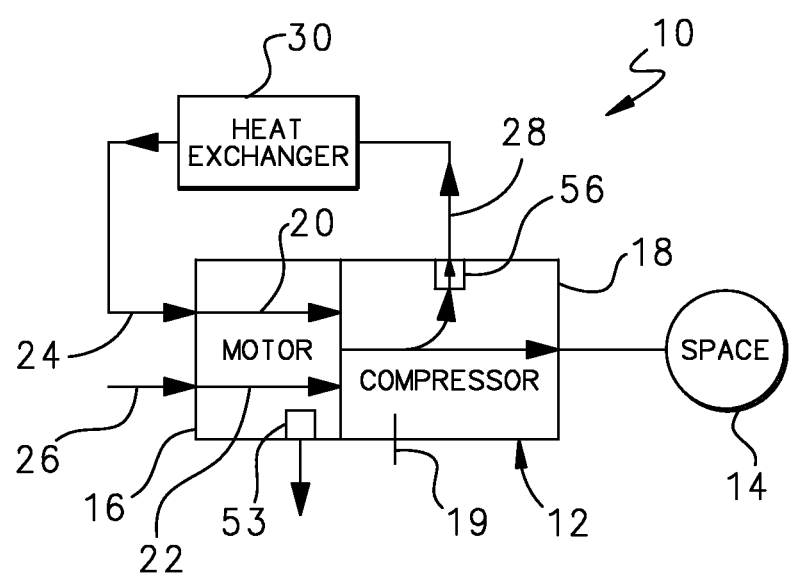
FIG. 1 is a schematic view of an example thermal management system.

FIG. 1 schematically illustrates selected portions of a thermal management system 10 that includes a motor driven assembly 12 for supplying pressurized air to a space 14, such as an aircraft cabin. The motor driven assembly 12 includes a motor 16, such as a permanent magnet motor, that drives a compressor 18. The compressor 18 receives air from an outside source through outside source inlet 19 (such as unpressurized ram air or cabin air) and the motor 16, compresses the air, and circulates the compressed air to the space 14.

The motor 16 includes a first cooling flow passage 20 and a second cooling flow passage 22 that each receive air to provide internal cooling of the motor 16. The first cooling flow passage 20 is connected to a first motor inlet 24 and the second cooling flow passage 22 is connected to a second motor inlet 26. The first cooling flow passage 20 and the second cooling flow passage 22 are each fluidly connected to the compressor 18 and supply air to the compressor 18.

A portion of the air compressed in the compressor 18 is diverted out of a compressor outlet 28 to a heat exchanger 30. The heat exchanger 30 cools the compressed air before the air circulates into the first motor inlet 24 to cool the motor 16. The second motor inlet 26 receives air from the environment surrounding the motor driven assembly 12, such as ram air. The flow of air through the first cooling flow passage 20 and the second cooling flow passage 22 removes heat from the motor 16 to provide the benefit of maintaining the motor 16 at a desirable operating temperature to prevent, for example, motor overheating.

Figure 2:
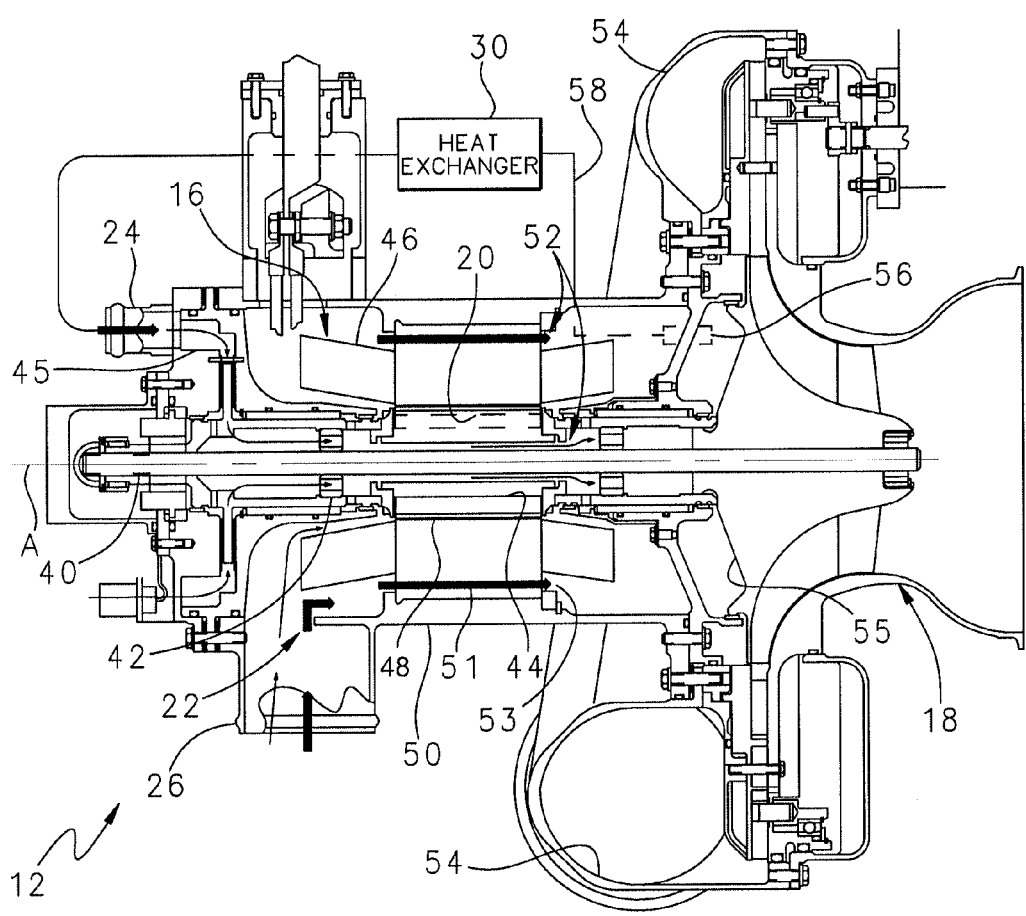
FIG. 2 is a schematic view of one embodiment of a motor driven assembly of the present invention.

Referring to FIG. 2, the motor 16 includes a shaft 40 mounted on a bearing 42 for rotation about an axis A. A motor rotor 44 is mounted on the bearing 42 for rotation with the shaft 40 about the axis A. The motor rotor 44 is spaced apart from the shaft 40 such that the first cooling flow passage 20 is between the shaft 40 and the rotor 44. Air incoming through the first motor inlet 24 flows through a motor conduit 45, through the bearing 42, into the first cooling flow passage 20, and into the compressor 18.

The second cooling flow passage 22 is divided into two passages. A motor stator 46 is spaced radially outward from the motor rotor 44 such that a stator-rotor passage 48 is between the motor rotor 44 and the motor stator 46. The motor stator 46 is spaced apart from a motor housing 50 such that a stator passage 51 is between the stator 46 and the motor housing 50. Intake air from the second motor inlet 26 is divided and flows either through the stator-rotor passage 48 or stator passage 51 to a motor outlet 52.

A vent valve 53 near the motor outlet 52 is selectively opened or closed to respectively vent air from the stator passage 51 to the surrounding environment or direct air to the motor outlet 52 for supply into the compressor 18. If the vent valve 53 is open, less air will flow into the compressor 18. If the vent valve is closed, more air will flow into the compressor 18. The vent valve 53 controls the air flow through the stator passage 51 to selectively control air flow into the compressor 18.

The shaft 40 extends from the motor housing 50 into the compressor 18 to drive a compressor rotor 55. The compressor rotor 55 compresses air received from the external source and motor outlet 52 and conveys compressed air through a compressor outlet 54 to the space 14. A bleed valve 56 near the compressor outlet 54 diverts a portion of the compressed air through a conduit 58 and into the heat exchanger 30. The heat exchanger 30 cools the compressed air before the air is conveyed to the first motor inlet 24. The heat exchanger 30 supplies cooled air to the first motor inlet 24, which results in a significantly cooler air than ambient and a significant cooling effect.

The motor 16 receives air for internal cooling of the motor 16 from two different sources. The first motor inlet 24 receives air from the heat exchanger 30 through the compressor bleed valve 56 and the second motor inlet 26 receives air from the surrounding environment. The first cooling flow passage 20 receives air from the first motor inlet 24 to generally cool the motor rotor 44 and the second cooling flow passage 22 receives air from the second motor inlet 26 to generally cool the motor stator 46 and the rotor-stator gap 48. Utilizing two different sources of cooling air provides the benefit of minimizing air pressure drop through the motor 16 (i.e., at the motor outlet 52). If the first cooling flow passage 20 is narrow and restricts air flow there through, there may be an undesirable pressure drop between the first motor inlet 24 and the motor outlet 53. The air flow through the second cooling flow passage 22 from the second motor inlet 26 to the motor outlet 53, however, provides additional air at the motor outlet 52 and minimizes the air pressure drop that might otherwise occur if only a single air inlet was utilized.

Figure 3:
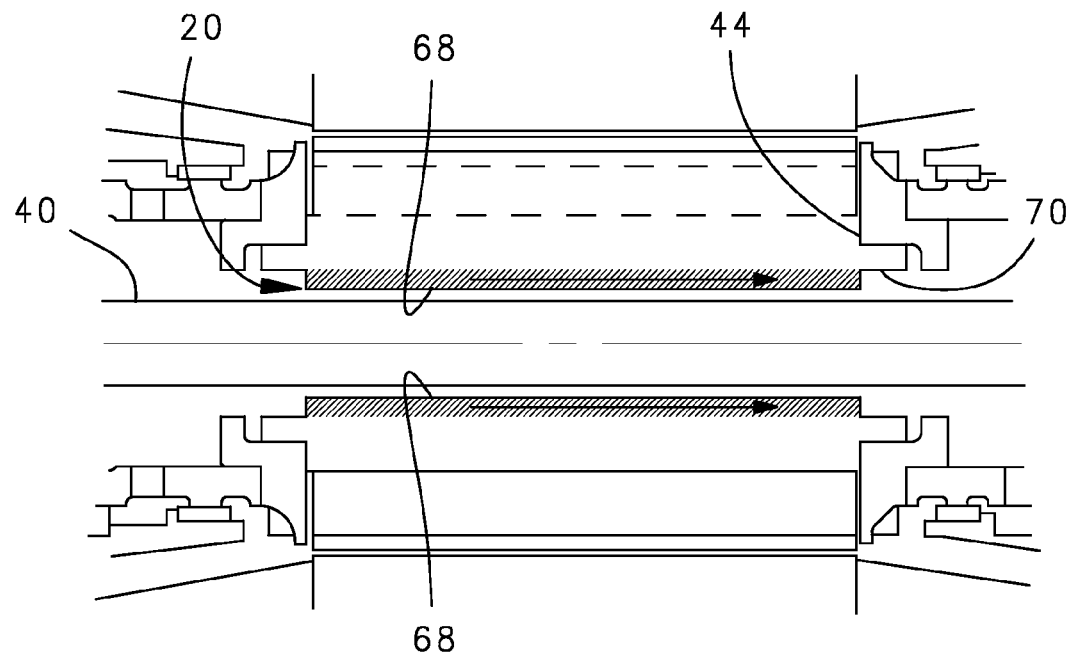
FIG. 3 is a schematic view of one embodiment of a cooling flow passage between a motor rotor and a motor shaft.
Figure 4:
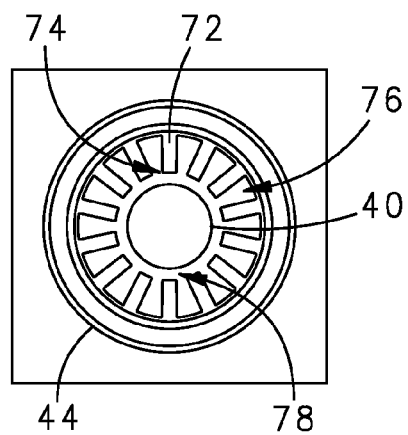
FIG. 4 is a cross-sectional view of the fins within the cooling flow passage shown in FIG. 3.

Referring to FIG. 3, the motor rotor 44 includes fins 68 that provide increased surface area (e.g., compared to a cylindrical, smooth surface) from which the motor rotor emits heat into the passing air. The fins 68 extend radially inward from an inner diameter 70 of the motor rotor 44 into the first cooling flow passage 20. The fins 68 each include a base portion 72 and a fin end 74 preferably having a squared profile, as illustrated in FIG. 4.

The fins 68 are spaced apart from each other and include first sub-passages 76 between the fins 68. The fins ends 74 are spaced radially from the shaft 40 such that a second sub-passage 78 is between the fins ends 74 and the shaft 40. Each fin 68 extends in a length direction (FIG. 3) approximately parallel to the rotational axis A such that the first cooling flow passage 20, which includes the first sub-passages 76 and the second sub-passage 78, extends approximately parallel to the shaft 40.

Figure 5:
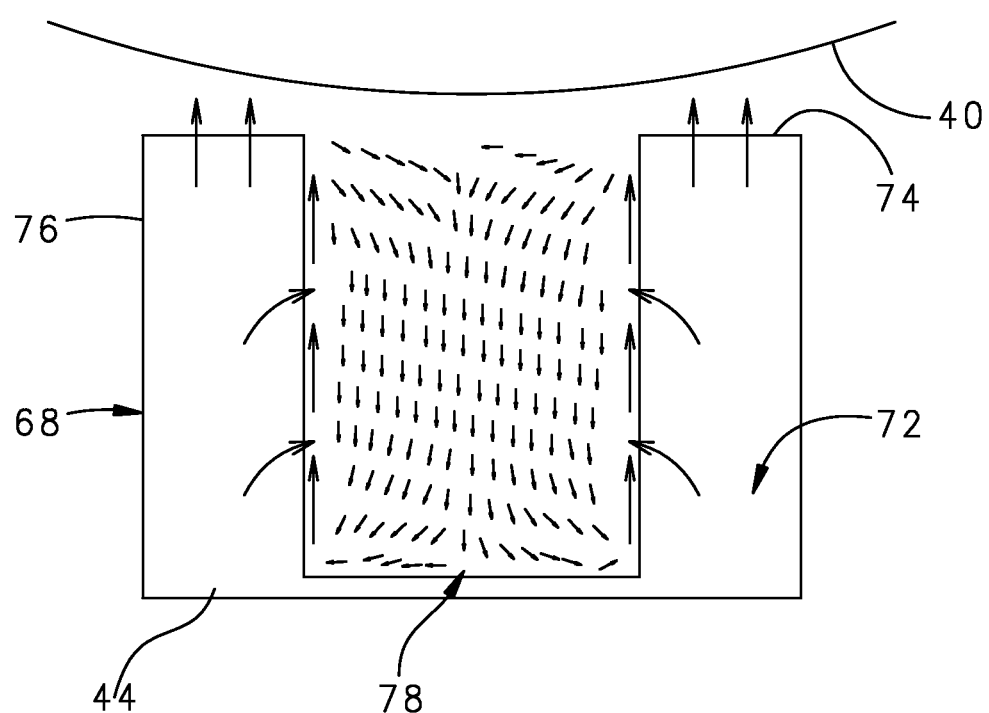
FIG. 5 is a cross-sectional view of sub-passages between the fins within the cooling flow passage and secondary flow pattern.

Incoming air flow from the first motor inlet 24 passes through the bearing 42 (FIG. 2) and into the first cooling flow passage 20. The air enters the first sub-passages 76 and the second sub-passage 78 before entering the compressor 18. The fins 68 provide a relatively large surface area from which the motor rotor 44 conducts heat to the air passing through the first cooling flow passage 20 to cool the motor 16. During operation of the motor driven assembly 12, air flowing in the first cooling flow passage 20 flows along the first sub-passage 76 and down into the second sub-passage 78, as illustrated in FIG. 5. The air passing though the first sub-passage 76 and second sub-passage 78 absorbs and carries away heat that the motor rotor 44 emits from the surfaces of the fins 68 and the shaft 40 to cool the motor 16. Owing to the centrifugal force generated by the rotation of the motor rotor 44, a secondary flow is produced in the airflow inside these fin channels. In addition to the flow in axial direction parallel to the motor rotor 44, a counter-rotating vortex, or secondary air flow pattern 45, is created in the airflow as shown in the FIG. 5. Additional heat transfer enhancement is achieved by this effect.

The fins 68 are preferably formed integrally with the motor rotor 44, such as by electrical discharge machining. Alternatively, the fins 68 are formed separately and then bonded to an inner diameter 70 (FIG. 3) of the motor rotor 44. If formed separately, the fins 68 may alternatively be manufactured of a material different than that of the motor rotor 44. This provides a benefit of selecting a material that has particularly tailored heat transfer properties, such as a material with a relatively high thermal conductivity.

Figure 6:
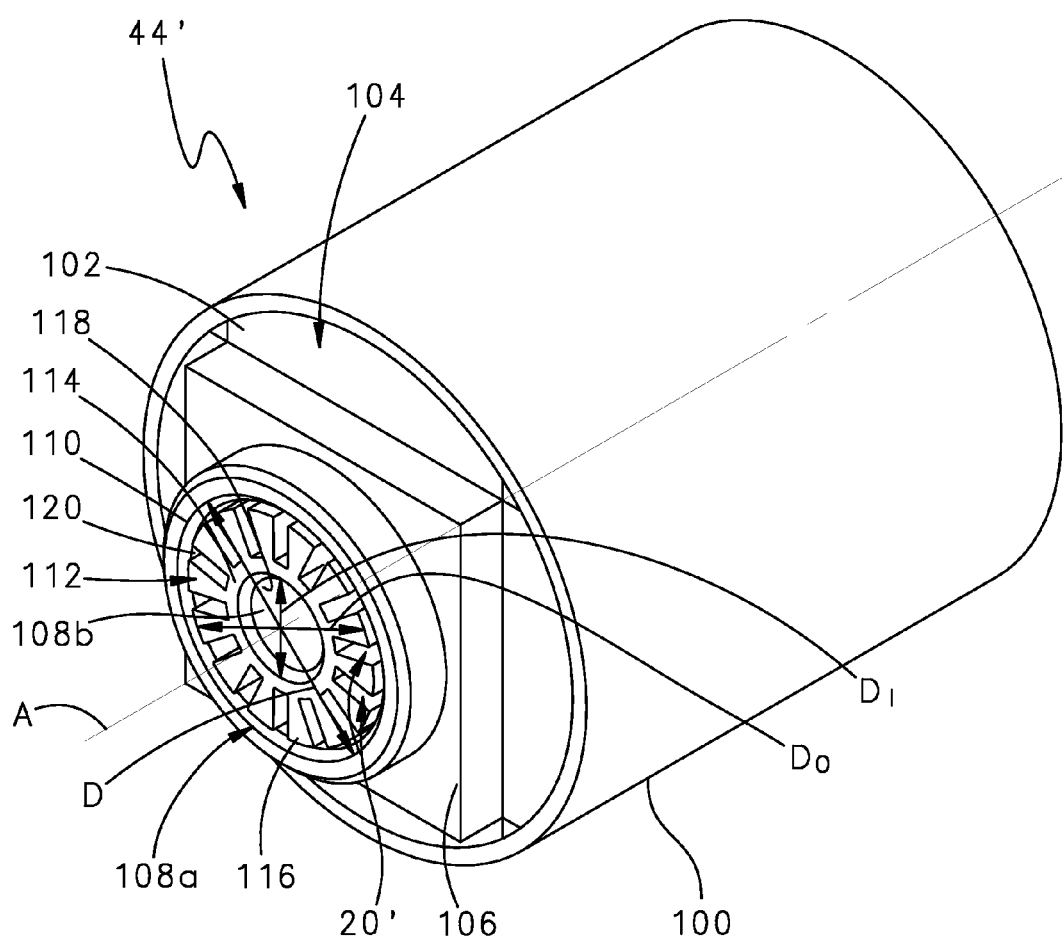
FIG. 6 is a perspective view of one configuration of fins within the cooling flow passage.

FIG. 6 illustrates a perspective view of another motor rotor 44' configuration. The motor rotor 44' includes a rotor can 100 about a periphery 102 of rotor pieces 104. Rotor pieces 104, such as permanent magnets, are assembled on a rotor hub 106. The rotor hub 106 includes a cylindrical opening 108a having a diameter D. The cylindrical opening 108a is parallel to the rotational axis A of the motor shaft 40.

A sleeve 110 is received in the cylindrical opening 108a and includes a cylindrical opening 108b for receiving the motor shaft 40. A plurality of fins 112 extend radially outward from a tubular base portion 114 of the sleeve 110. Each fin 112 includes a fin end 116. In the illustration, the fin ends 116 have a square profile, however, the fin end 116 profiles may alternatively be rounded, tapered, or other shape to achieve a desired cooling effect as described above. The spaces between the fins 112 form the first cooling flow passage 20'.

The sleeve 110 includes an outer diameter $D_O$ that extends between opposite fin ends 116 and an inner diameter $D_I$ that extends between opposite sides of a smooth inner surface 118 of the cylindrical opening 108b of the sleeve 110. The size of the outer diameter $D_O$ of the sleeve 110 is slightly smaller than the diameter D of the cylindrical opening 108a. In a generally known assembly procedure for assembling tight fitting components together, the sleeve 110 is chilled to thermally contract the size of the diameter $D_O$. The contraction allows the sleeve 110 to fit into the cylindrical opening 108a. After being inserted, the sleeve 110 warms and thermally expands as it returns to ambient temperature to provide a tight fit between the sleeve 110 and the rotor hub 106.

During operation of the motor 16, the rotor pieces 104 transfer heat from to the rotor hub 106. The rotor hub 106 transfers heat to the sleeve 110 through contact surfaces between the fin ends 116 and an inner surface 120 of the rotor hub 106. The fins 112 and rotor hub 106 emit heat into the air flowing through the first cooling flow passage 20' between the fins 112 to provide a cooling effect on the motor 16.

Figure 7:
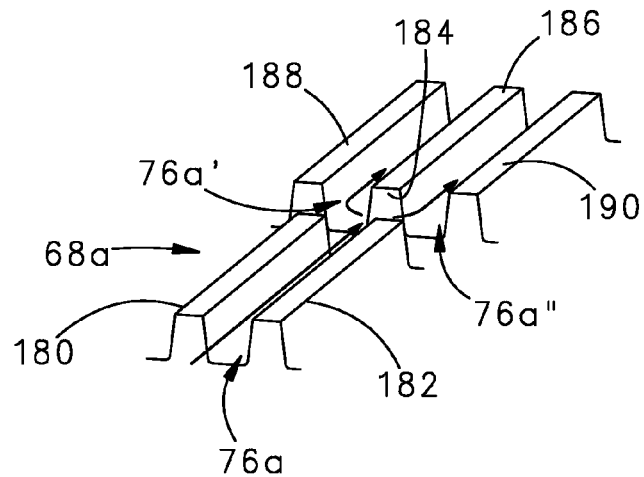
FIG. 7 is a perspective view of another configuration of fins within the cooling flow passage.

FIG. 7 illustrates an alternate fin configuration to that shown in FIGS. 4 and 6 in which the fins 68a are offset from one another to produce a discontinuous flow path through the first cooling flow passage 20. Air flow enters a second sub-passage 76a between a first fin 180 and a second fin 182. The air exits the second sub-passage 76a and flows into a forward surface 184 of a third fin 186. The air flows around the forward surface 184 into second sub-passages 76a' and 76a" between fins 186, 188, and 190. This configuration provides the benefit of additional surface area, such as the forward surface 184, from which the motor rotor 44 emits heat into the passing air.

Figure 8:
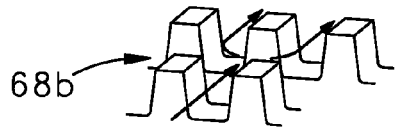
FIG. 8 is a cross-sectional view of a rounded profile fin.

Referring to another alternate configuration shown schematically in FIG. 8, post fins 68b are offset from one another to produce a discontinuous flow path similar to that shown in FIG. 7. The post fins 68b, or extended surface portions, have a squared profile, however, the profile can be selected to achieve a desired cooling effect as will be described below.

Figure 9:
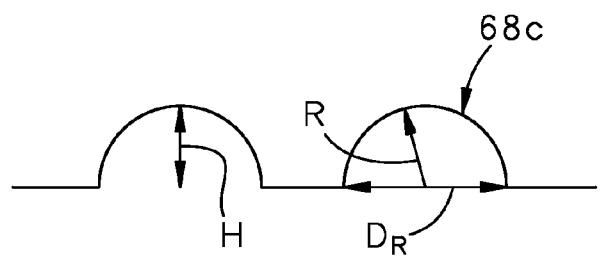
FIG. 9 is a cross-sectional view of a tapered profile fin.

FIG. 9 schematically illustrates an alternate fin profile in which the fins 68c include rounded profiles. The rounded profile fins 68c include a fin height H, a radius of curvature R, and a width dimension $D_R$. The height H, radius R, and width $D_R$ are selected based upon a desired cooling effect as described below.

Figure 10:
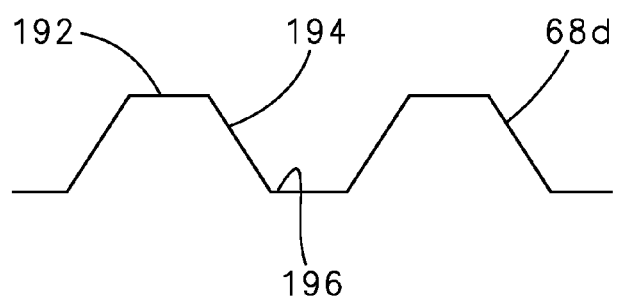
FIG. 10 is a perspective view of one embodiment of a motor rotor having a sleeve with radially extending fins.

Referring to FIG. 10, the fins 68d include tapered profiles. The tapered fins 68d include relatively flat fin ends 192 and angled surfaces 194 that extend from the fin ends 192 to a fin base 196.

The geometry (e.g., size and shape) of the fins 68a-d are tailored to achieve a desired cooling effect in the motor 16. The amount of heat that the motor rotor 44 transfers to air passing through the first cooling passage 20 generally corresponds to the amount of exposed surface area of the fins 68a-d in the first cooling flow passage 20. In selecting the size and shape of the fins 68a-d, the available air flow from the first motor inlet 24, an expected air pressure drop across the first cooling flow passage 20, and a desired amount of heat transfer from the motor rotor 44 may also be taken into consideration to achieve a desired cooling level. Given this description, one of ordinary skill in the art will be able to select a fin size and shape to meet their particular motor cooling needs.

Although a preferred embodiment of this invention has been disclosed, a worker of ordinary skill in this art would recognize that certain modifications would come within the scope of this invention. For that reason, the following claims should be studied to determine the true scope and content of this invention.

We claim:

1. A motor driven assembly comprising:
   a motor having a motor inlet, a motor outlet, a shaft, and a rotor spaced radially outwards from said shaft;
   a cooling flow passage located radially outward from said shaft and radially inward from an inner surface of said rotor that fluidly connects said motor inlet and said motor outlet, wherein said cooling flow passage includes a cooling flow passage inlet located at a first end of said rotor and a cooling flow passage outlet located at a second end of said rotor; and
   a compressor in direct fluid communication with said motor outlet, said compressor having a compressor outlet in fluid communication with said motor inlet; and
   a heat exchanger outside of said motor and in fluid receiving communication with said compressor outlet.

2. The assembly as recited in claim 1, wherein said motor includes a second motor inlet and a second cooling flow passage that fluidly connects the second motor inlet and the motor outlet.

3. The assembly as recited in claim 2, wherein said motor includes a motor housing, said rotor that is rotatable about an axis, and a stator located radially outward from said rotor, and said second cooling flow passage includes a stator passage between said stator and said motor housing.

4. The assembly as recited in claim 2, wherein said second cooling flow passage further includes a stator-rotor passage between said stator and said rotor.

5. The assembly as recited in claim 2, wherein said motor includes a motor housing and a stator located radially outward from said rotor, said second cooling flow passage being between said stator and said rotor.

6. The assembly as recited in claim 3, further comprising a valve near said motor outlet for selectively directing air to said compressor.

7. The assembly as recited in claim 1, wherein said cooling flow passage is configured to accept cooling air.

8. The assembly as recited in claim 1, wherein said cooling flow passage is located radially outward from an outer surface of said shaft and radially inward from said inner surface of said rotor.

9. The assembly as recited in claim 1, wherein said cooling flow passage extends from a first end of said rotor to a second end of said rotor.

10. The assembly as recited in claim 1, wherein said cooling flow passage is configured to allow a cooling fluid to flow from a first end of said rotor to a second end of said rotor.

11. A motor driven assembly comprising:
    a motor having a motor inlet, a motor outlet, a shaft, and a rotor spaced radially outwards from said shaft;
    a cooling flow passage between said shaft and said rotor that fluidly connects said motor inlet and said motor outlet for accepting cooling air;
    a compressor in direct fluid communication with said motor outlet, said compressor having a compressor outlet in fluid communication with said motor inlet; and
    a heat exchanger outside of said motor and in fluid receiving communication with said compressor outlet.

12. The assembly as recited in claim 11, wherein said motor includes a second motor inlet and a second cooling flow passage that fluidly connects the second motor inlet and the motor outlet.

13. The assembly as recited in claim 12, wherein said motor includes a motor housing, said rotor that is rotatable about an axis, and a stator located radially outward from said rotor, and said second cooling flow passage includes a stator passage between said stator and said motor housing.

14. The assembly as recited in claim 12, wherein said second cooling flow passage further includes a stator-rotor passage between said stator and said rotor.

15. The assembly as recited in claim 12, wherein said motor includes a motor housing and a stator located radially outward from said rotor, said second cooling flow passage being between said stator and said rotor.

16. The assembly as recited in claim 11, wherein said cooling flow passage extends from a first end of said rotor to a second end of said rotor.

17. The assembly as recited in claim 11, wherein said cooling flow passage is configured to accept cooling air.

18. The assembly as recited in claim 11, wherein said compressor is configured to accept a cooling fluid from said motor outlet prior to said cooling fluid entering a heat exchanger.

* * * * *